Patented Nov. 6, 1928.

1,690,131

UNITED STATES PATENT OFFICE.

FLOYD W. ROBISON, OF DETROIT, MICHIGAN.

FOOD PRODUCT IN FORM OF DRY POWDER AND METHOD OF MAKING THE SAME.

No Drawing.   Application filed March 23, 1927. Serial No. 177,839.

This invention relates to a process for producing a food product more particularly a process whereby the juice of fruit such as orange, lemon, grape etc., may be secured in substantially dry, powdered or granular form and self-preservative in character and which upon reconstitution with water reproduces the original flavor and aroma of the fresh fruit juice in sweetened form for immediate consumption or use.

Various efforts have heretofore been made to preserve fruit juice either by concentrating the juice and adding sufficient sugar to make the product self-preservative or by adding the juice to an absorbent and drying material. Neither of these methods has been found commercially successful. The first method of concentrating the juice impairs the flavor due in part to vaporization of the volatile product through heat applied in the process and the second plan is unsatisfactory in its result particularly in that the product on restoration to liquid form is insipid and flat in flavor. If, in such process, sugar is used as an absorbent for natural fruit juice the quantity of suger necessary to make the product self-preservative is so great that, on reconstitution by the addition of water to secure proper fluidity, the reconstituted product is too sweet.

As previously stated, to attempt to concentrate the natural fruit juice is to a great extent impracticable or productive of an unsatisfactory result particularly in that a bad taste is produced through the heating and loss of the volatile flavoring matter and my invention seeks to provide a process by means of which a fruit juice is obtained in a comparatively dry granular form self-preservative in character through use of sufficient sugar content to secure such result and which upon addition of sufficient water to secure the desired fluidity is not excessively sweet and does have the quality, aroma and flavor of the natural fruit juice and by varying the proportion of the materials such flavor and aroma may be accentuated to any desirable extent.

The essential characteristic of the process will be understood from the following—

With one pound of granulated sugar I mix 113 grams concentrated commercial pectin.

6½ grams citric acid in the case of orange or lemon or the tartaric and mallic acid found in grape.

25 cubic centimeters of fresh juice expressed from the fruit and in the case of citrous fruits like orange or lemon I add the powdered outer skin and fragrant portion of the peel in quantity approximately that of one-half to one orange or lemon of medium size and to this add coloring matter consisting of tartrazine and orange 1 in proportion and quantity to give it the desired coloring.

These ingredients in substantially the portions stated are thoroughly mixed in any approved manner and the product is then dried to a point where it contains approximately one-half of one per cent of moisture and at a temperature below that tending to vaporize the volatile constituents.

The feature of this invention is in the provision of comparatively small quantity of the fresh juice of the fruit in comparison to the quantity of the material mixed together. The purpose of this is to keep the water content low at the time of mixing so that the drying process may be performed speedily at a low temperature. The sugar content of the mixture is in the neighborhood of seventy-five per cent of its volume and in order to secure the natural characteristics of sweetened fruit juice upon restoring the material to fluidity approximating that of the natural juice I add the concentrated commercial acids and pectin of the fruit. If nothing but natural fruit juice was used to secure the flavor and aroma the product would be flat or insipid if diluted to the point where the liquid is not too sweet. The concentrated pectin and concentrated fruit acids and flavors are at the present time common articles of commerce being used for different purposes in the manufacture of the fruit products and for flavoring of soft drinks etc. In the case of the grape the concentrated true fruit flavors usually used for flavoring soft drinks is utilized and in the case of oranges and lemons I use orange and lemon juice. I use orange and lemon juice containing crushed and macerated orange and lemon peel together with the true fruit flavor obtained, in the case of grape, from carefully concentrated, extraced and precipitated grape products and, in the case of lemons and oranges, from the crushed and macerated lemon and orange peel. While the concentrated acids and pectin are found in commercial use the addition of these alone to a sugar base would not produce on reconstitution the natural flavor and aroma of the fruit. This natural flavor and aroma I secure by the addition of a comparatively small quantity of the fresh juice expressed from the fruit and used practically immediately upon being expressed and previous to deterioration. With such sugar content and inadequate quantity of fruit juice to make a desirable product when reconstituted, I add acids, flavoring and pectin in concentrated form to secure the necessary sharpness and tang of the fruit flavor and in so doing I avoid the producing of a mass too fluid in form at the time of the mixing requiring a long period of time for drying or requiring an application of heat which would result in an undesirable product.

With the sugar and the concentrated acids, pectin etc., and the small quantity of fruit juice I secure a product at the time of the mixing whose viscosity is very great, the mass although very thick still is fluid to a certain degree permitting it to be readily spread upon a tray in a thin sheet over which a current of cool and preferably dry air is passed to absorb the moisture content. To assist in the drying step I preferably stir the mixture lightly. Any approved method, however, may be employed for this drying step providing that heat is not applied to such extent as would cause a material loss of volatile matter or cause a fusing or melting of the sugar. The product upon drying may be packaged in any approved way in sealed receptacles or even unsealed receptacles as the product is self-preservative in form through having a sugar content in excess of sixty per cent, this quantity of sugar content being sufficient to preserve the product even though it is not dried to that extent in which it contains approximately one-half of one per cent moisture.

Subsequent to the drying operation above described the product is passed through a mill with sieves for granulating, the purpose of this being to insure a uniform granular or powdered product.

The quantities of material and the exact materials used depend largely upon the character of the juice which it is desired to secure by reconstitution. For instance if a grape product is to be produced the formula will be as follows—

To 1 pound granulated sugar is added 6¼ cubic centimeters of a pure heavy grape juice.

2½ to 5 cubic centimeters of concentrated grape extract.

113 grams commercial pectin.

6½ grams tartaric acid from grape.

2 grams certified red coloring, amaranth.

½ gram of certified blue color, indigo di-sulpho acid.

These are mixed and dried in the manner above described.

This product is not only to be utilized in the preparation of a drink which is the general purpose of the product in the proportions above mentioned but it may also be used in the making of jellies and the like and for this purpose, in addition to the amount of pectin mentioned, I may add an amount of dry pectin or heavy concentrated pectin depending upon the amount necessary of each fruit pectin to produce a jellying property, so it is to be understood that quite a wide variation in the specific quantities mentioned is possible in the preparation of the product for which the powder is to be used but in any case the process is characterized by the fact that a subnormal amount of fruit juice is mixed with the sugar base and sufficient quantity of concentrated fruit acid, fruit flavor and pectin is utilized to approximate the natural juice upon reconstitution and with the desired sweetness in sugar content either for use as a drink or in a jellying process. It is this particular feature of the process which distinguishes the same from previous processes for a like purpose.

It will be evident from the foregoing that by applicant's method several things are accomplished. First—by use of an inadequate amount of natural juice with an amount of sugar to secure self-preservation of the mass the mixture is very low in water content and therefore I am able to reduce the same to substantial dryness without the use of heat to a degree detrimental in effect or sufficient to materially reduce the volatile matter and further, as it is desired to secure a liquid palatably sweet upon reconstitution with water, water in excess of that supplied by the natural juice must be used and in order that the reconstituted volume may have the natural proportion of fruit juice ingredients an excess flavoring matter (in the case of citrous fruits natural flavor secured by powdered outer skin) is added permitting introduction of commercial concentrated acids and pectin to balance the flavor. Thus the reconstituted liquid has all of the ingredients of the fruit juice in normal proportion including the volatile elements ordinarily lost in processes where concentration, sterilization or pasteurization is used as a step. It is therefore in the peculiarity of the steps of applicant's process that the invention exists as is more particularly set forth in the appended claims.

It will be understood from the foregoing that the exact formula in any case will depend largely upon the character of the juice it is desired to secure by reconstitution, two instances of which are specifically given above. In case of any fruit the procedure is substantially the same and the appended claims are to be read with the understanding that variation in the ingredients and the specific quantities thereof may be made as is required by the character of the juice to be secured by reconstitution with water.

Having thus briefly described my improved process and the product resulting therefrom what I claim and desire to secure by Letters Patent of the United States is:—

1. The method of providing a substantially dry powder self-preservative in form having characteristics of the natural juice of a fruit palatably sweet upon reconstitution with water which consists in first thoroughly mixing together a quantity of sugar sufficient to secure self-preservation of the mass, a sub-normal quantity of the fresh juice of the fruit, concentrated acids, flavor and pectin of the fruit to secure normality in these constituents upon reconstitution, and submitting the mixed ingredients to a current of moisture absorbing air having a temperature below that tending to cause a material loss or change in the volatile constituents other than water.

2. The method of providing a substantially dry powder having the characteristics of natural juice of citrous fruit palatably sweet upon reconstitution with water, which consists in mixing with a quantity of sugar sufficient to secure self-preservation of the mass a small quantity of fresh juice of the fruit together with sufficient concentrated acids and pectin of the fruit to provide those constituents in quantity lacking through the utilization of an inadequate amount of natural fruit juice, a quantity of the crushed and powdered outer skin of the fruit to secure flavoring matter normal to the quantity of the natural juice as reconstituted, and coloring matter to secure a desired color when reconstituted with water, the said mass being thoroughly mixed together and air dried at a temperature below that tending to materially reduce the volatile content.

3. The method of providing a substantially dry powder self-preservative in form and having the characteristics of the natural juice of a fruit upon reconstitution with water which consists in thoroughly mixing together granulated sugar in quantity sufficient to secure self-preservation of the mass, fresh juice of the fruit in quantity below that to give the reconstituted product the flavor and aroma required, sufficient concentrated acid, flavor and pectin of the fruit and coloring matter to provide those constituents lacking in quantity through the addition of the natural fruit juice and drying the mixed ingredients at a temperature below that tending to cause material loss or change in the volatile constituents other than water.

4. The product, a self-preservative powder of crystalline form secured by drying the following ingredients substantially in the proportion stated—namely, 1 lb. concentrated sugar, 25 cubic centimeters of fresh fruit juice, 113 grams concentrated commercial pectin of the fruit, 6½ grams concentrated acid of the fruit, coloring matter, and sufficient additional natural fruit flavor which with that introduced with the fresh juice provides a quantity normal in respect to the acids and pectin constituents.

5. The method of procuring a substantially dry powder in crystalline form, having the characteristics of natural juice of citrous fruit palatably sweet upon reconstitution with water which consists in maxing with a quantity of sugar sufficient to secure self-preservation of the mass, of a small quantity of natural fresh juice of the fruit, commercial concentrated acids and pectin of the fruit in proportion approximating that of the excess sugar content, a quantity of crushed and powdered outer skin of the fruit to provide natural flavoring matter in proportion corresponding to the fruit acids and pectin content, and coloring matter, the mass being thoroughly mixed together and dried without material reduction of the volatile content and providing a substantially dry powder base that upon reconstitution with water in excess of that supplied by the fresh fruit juice has all the elements of the natural fruit in normal proportion to the reconstituted volume.

6. The new product, a substantially dry powder in crystalline form secured by drying the following ingredients—namely, a quantity of natural fruit juice, sugar in quantity sufficient to secure self-preservation of the mass, concentrated acids and pectin of the fruit, and additional natural fruit flavor in quantity proportional to the excess sugar content, and coloring matter providing a mass capable of reconstitution with water to provide a palatably sweet liquid with the fruit flavor, acid and pectin normal to the volume as reconstituted.

7. A dry citrous fruit product crystilline in form and self-preservative in character capable of reconstitution with water in excess of the volume supplied by the natural fruit juice in preparing powder secured by drying of the following ingredients substantially in the proportion stated—1 lb. granulated sugar, 25 cubic centimeters of fresh fruit juice, 113 grams concentrated commercial pectin of the fruit, 6½ grams concentrated acid of the fruit, and a sufficient quantity of the crushed and powdered outer peel of the fruit to provide flavoring matter normal to the acid and pectin content whereby, upon reconstitution with water in volume to secure a palatably sweet product, the acid, flavor and pectin of the fruit are normal to the reconstituted volume.

In testimony whereof I sign this specification.

FLOYD W. ROBISON.